United States Patent Office 3,748,323
Patented July 24, 1973

3,748,323
6-(SULFATO ACYLAMINO)PENICILLANIC ACIDS AND ESTERS THEREOF

Ernest S. Hamanaka, Groton, Conn., assignor to Pfizer Inc., New York, N.Y.
No Drawing. Filed July 9, 1971, Ser. No. 161,300
Int. Cl. C07d 99/16
U.S. Cl. 260—239.1         10 Claims

ABSTRACT OF THE DISCLOSURE

Broad-spectrum antibacterial agents; namely, 6-(sulfato acylamino)penicillanic acids of the formula:

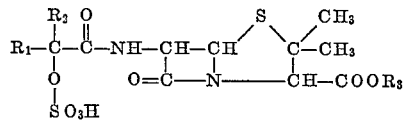

and the non-toxic cationic salts thereof wherein
$R_1$ is thienyl, alkyl, cycloalkyl, phenyl or substituted phenyl wherein the substituent is lower alkyl, lower alkoxy, chloro, bromo or trifluoromethyl;
$R_2$ is hydrogen or lower alkyl;
$R_1$ and $R_2$ together with the carbon atom to which they are attached represent cycloalkyl;
$R_3$ is hydrogen and acyloxy lower alkyl wherein the acyloxy moiety is lower alkanoyloxy, benzoyloxy or substituted benzoyloxy wherein the substituent is chloro, bromo, fluoro, lower alkyl, lower alkoxy or trifluoromethyl.

BACKGROUND OF THE INVENTION

This invention relates to a novel series of antibacterial agents and, more particularly, to 6-(sulfato acylamino) penicillanic acids, to the non-toxic cationic salts and esters thereof, and to methods for their preparation.

The properties, particularly the antibiotic properties, of a given penicillin are determined to a large extent by the acyl group. The best known and most widely used penicillins: benzylpenicillin, phenoxymethylpenicillin and, more recently, α-phenoxyethylpenicillin wherein R represents the benzyl, phenoxymethyl- and α-phenoxyethyl- radicals, while highly antagonistic toward gram-positive microorganisms are ineffective against the so-called antibiotic resistant strains of bacteria and of limited gram-negative activity, important causes of severe infections and deaths in hospitals today, and are readily destroyed by penicillinase. Therefore, drugs which will combat the continuing rise in Staphylococci incidence and fatality and gram-negative infections, e.g., Pseudomonas, are of immeasurable value to the medical profession.

The situation has been improved by the recent introduction of α-carboxybenzylpenicillin (U.S. 3,142,673, July 28, 1964) as a broad-spectrum antibiotic of particular value against gram-negative infections via the parenteral route of administration.

Efforts to produce new penicillin antibiotics of greater efficacy have resulted in the preparation of a variety of other α-substituted acylpenicillins. Belgian Pat. 726,421, granted July 3, 1969, describes esters of a series of α-carboxyarylmethylpenicillins. Netherlands specification 6914718, published Apr. 1, 1970, describes a large number of α-(sulfo)-acylpenicillins and cationic salts thereof.

SUMMARY OF THE INVENTION

It has now been found that 6-(sulfato acylamino)penicillanic acids of the formula:

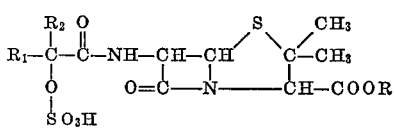

are effective antibacterial agents, especially useful against gram-negative bacteria. In the above formula,
$R_1$ is selected from the group consisting of thienyl, alkyl of from 1 to 15 carbon atoms, cycloalkyl of from 3 to 7 carbon atoms, phenyl and substituted phenyl wherein the substituent is selected from the group consisting of lower alkyl, lower alkoxy, chloro, bromo and trifluoromethyl;
$R_2$ is selected from the group consisting of hydrogen and lower alkyl;
$R_1$ and $R_2$ when taken together with the carbon atom to which they are attached are cycloalkyl of from 3 to 7 carbon atoms; and
$R_3$ is selected from the group consisting of hydrogen and acyloxy lower alkyl wherein the acyloxy moiety is selected from the group consisting of lower alkanoyloxy, benzoyloxy and substituted benzoyloxy wherein the substituent is selected from the group consisting of chloro, bromo, fluoro, lower alkyl, lower alkoxy and trifluoromethyl.

These novel compounds can exist in epimeric "D" and "L" forms. It will be convenient to refer to these epimers as the D- and L-epimers. Therefore, included within the purview of this invention are the D- and L-epimers and mixtures thereof of the compounds of Formula I above, each of which exhibits substantial therapeutic activity. Also included within the scope of this invention are the non-toxic cationic, i.e., the pharmaceutically-acceptable salts of the novel compounds of the above formula in which one or both acid groups are involved in salt formation. Salts such as the sodium, aluminum, potassium, calcium, magnesium, ammonium and substituted ammonium salts, e.g., procaine, dibenzylamine, N,N'-dibenzylethylenediamine, N,N'-bis(dehydroabietyl)ethylenediamine, 1-ephenamine, N - ethylpiperidine, N - benzyl-β-phenethylamine, triethylamine, as well as salts with other amines which have been used to form salts with benzylpenicillin are of significant activity against the antibiotic resistant Staphylococci and are useful for the preparation of pharmaceutically-elegant compositions of these valuable antibiotics.

The preferred "lower alkyl," "lower alkoxy" and "lower alkanoyloxy" groups are those alkyl, alkoxy and alkanoyloxy groups having up to, and including, four carbon atoms since the reactants needed to prepare such groups are readily available. The term "thienyl" used herein includes the 2-thienyl and 3-thienyl groups.

The novel antibacterial products of this invention are of value as additives to materials such as fuels and cutting oils which are subject to bacterial deterioration and are useful in soaps and shampoos, and in topical compositions for treatment of wounds. They are also remarkably effective in treating a number of infections caused by susceptible gram-negative and gram-positive bacteria in poultry and animals, including man. For such purposes, the pure materials or mixtures thereof with other antibiotics can be employed. They may be administered alone or in combination with a pharmaceutical carrier on the basis of the chosen route of administration and standard pharmaceutical practice. For example, they may be injected parenterally, that is, intramuscularly or subcutaneously. For parenteral administration, they are best used in the form of a sterile solution which may be either aqueous, such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

DETAILED DESCRIPTION OF THE INVENTION

The novel and valuable compounds of the present invention are prepared from 6-aminopenicillanic acid or an ester thereof by any of several known methods for introducing an acyl substituent into a primary amine. They can, for example, be prepared by the acylation in a reaction-inert solvent of 6-aminopenicillanic acid or an ester thereof with a functional derivative of the carboxy group of the appropriate sulfo-glycolic acid reactant, $$R_1R_2C(OSO_3H)COOH$$

such as the corresponding acid chloride, acid bromide or or anhydride, especially the mixed anhydride with other carboxylic acids such as ethoxy and isobutoxy carbonic acid, at a pH value of from about 6 to about 9, and at a temperature of from about 0° C. to about 50° C. The acylation can be conducted under a wide variety of conditions. It can, for example, be conducted in an aqueous reaction medium of an unstable emulsion of water and a water-immiscible organic solvent such as methyl isobutyl ketone and lower alkyl acetates over the pH range of about 2 to 4 and a temperature range of about 0° C. to 50° C. It can also be carried out over the pH range of from about 6 to 9 in aqueous solution (water or water acetone) at a temperature of from 0° C. to 50° C.

Alternatively, they can be prepared by the reaction of the appropriate 6-aminopenicillanic acid compound with the appropriate sulfo-glycolic acid reactant in the presence of a condensing agent, e.g., a carbodiimide, such as 1,3-dicyclohexylcarbodiimide or other carbodiimides as are described in U.S. 3,252,973, issued May 24, 1966; or an alkoxyacetylene such as ethoxyacetylene. Additionally, the appropriate acid azide or an active ester or thio ester of the carboxy moiety of the acid reactant with a phenol or thiophenol can be used as acylating agent. Further the 6-aminopenicillanic acid can first be converted to a mono- or disilyl derivative by reaction with a trialkylsilyl halide or a trialkylsilylamine which is then acylated with an appropriate organic acid acylating agent (a carboxylic acid, acid anhydride or acid halide) and hydrolyzed to remove the protecting group (the "silyl" method) as described in U.S. Pat. 3,249,633, issued May 3, 1966.

The sulfo-glycolic acid reactant or functional derivative thereof can, depending of course upon the pH of the reaction mixture, be used as the free acid or as an alkali metal or amine salt of the sulfonic acid group. The tri-(lower alkyl)amine salts, especially the triethylamine salt and the N-ethylpiperidinium salt, represent convenient forms of the sulfo-glycolic acid reactant, particularly when a mixed anhydride of the suflo-glycolic acid is used as acylating agent. Such salts are of definite value when the the acylation is conducted in a non-aqueous system. In such instances, an amine salt, e.g., the triethylamine or N-ethylpiperidine salt, of the 6-aminopenicillanic acid serves as suitable form of 6-aminopenicillanic acid. The acylation when conducted in a non-aqueous system is generally conducted at an initial temperature of as low as —40° C. during the combining of the reactants and is then gradually raised to room temperature or higher, e.g., about 50° C., if necessary.

In addition to the above purely chemical techniques of acylation, a sonochemical technique, that is, the application of vibrations of ultrasonic frequency (35,000 to 90,000 cycles per second), as described in U.S. Pat. 3,079,314, issued Feb. 26, 1963, can also be used to achieve acylation of 6-aminopenicillanic acid or ester thereof, especially acylation with an acid halide or anhydride. Acylation under such conditions is rapid and permissive of a wide range of reaction media; aqueous and non-aqueous alike, homogeneous and non-homogeneous, including emulsified systems.

Of the several known methods for acylating 6-aminopenicillanic acid or an ester thereof cited above, the favored routes employ an acid halide or mixed anhydride of the appropriate sulfo-glycolic acid reactant, a reaction-inert solvent system and a temperature range of from 0° C. to 50° C.

The esters of this invention, compounds of the above formula wherein $R_3$ is acyloxy(loweralkyl), are prepared by reacting an alkali metal salt (sodium, potassium, lithium) or a tertiary lower alkyl amine salt (e.g., triethylamine) of penicillins of the above formula, wherein $R_3$ is hydrogen, with the appropriate acyloxy(lower alkyl)halide (chloride or bromide) of the formula $R_3$-halide. The reaction is normally conducted in a reaction-inert solvent such as tetrahydrofuran, dimethylformamide, dimethylsulfoxide or hexamethylphosphoramide. In practice, the halide is added, preferably dropwise, to a solution or suspension of an alkali metal or amine salt of the precursor penicillin compound. At least one mole of the halide reactant is added per mole of penicillin compound, but in certain cases it may be advantageous to employ as much as a 50 percent excess. The reaction may be carried out at temperatures of from 0° C. to 50° C., with a preferred range of from 20° C. to 30° C. Reaction time will vary according to the temperature employed and the reactivity of the appropriate starting materials. Normally, the reaction period will range anywhere from one to twenty hours.

Upon completion of the reaction, the desired product is isolated by such standard means as by concentration of the reaction mixture. The residue is treated with acetone to dissolve the penicillin compound and separated from the inorganic salt by-product. Evaporation of the acetone solvent, preferably in vacuo, provides the product, generally in a crude state of purity. Further purification of the desired product is achieved by conventional recrystallization techniques or by chromatographing over a polyamide resin such as Polyamide CC–6, a polycaprolactam distributed by Brinkman Instruments, Westbury, N.Y.

The acyloxy(lower alkyl) esters can also be prepared by the above-described acylation procedures but using the appropriate acyloxy(lower alkyl) 6-aminopenicillanate in place of 6-aminopenicillanic acid or a salt thereof. The acyloxy(lower alkyl) 6-aminopenicillanates are prepared by reacting an alkali metal or amine salt of 6-aminopenicillanic acid with the appropriate chloro (or bromo) lower alkyl acyloxy reactant in a suitable solvent as is described above, by Belgian Pat. 721,515 and by Daehne et al., J. Med. Chem. 13, 607–612 (1970).

The necessary sulfo-glycolic acid reactants, $$R_1R_2C(OSO_3H)COOH$$

are readily prepared by methods known to those skilled in the art. Such methods comprise reaction of the appropriate glycolic acid derivative, generally in the form of an ester, with chlorosulfonic acid in a reaction-inert mutual solvent at a temperature of from about −10° C. to about room temperature and in the presence of an acid acceptor, e.g., triethylamine. Alternatively, they are prepared by reacting the appropriate glycolic acid ester with a condensing agent of the type mentioned above, e.g., 1,3-dicyclohexylcarbodiimide, followed by reaction of glycolic acid ester-carbodiimide mixture with sulfuric acid. The reaction is advantageously conducted at a temperature below room temperature and preferably at a temperature of from about −30° C. to 10° C. In a modification of this method, the carbodiimide (or other condensing agent) is brought into contact wtih a mixture of the glycolic acid ester and sulfuric acid in a reaction-inert solvent. Suitable solvents for the above described methods are N,N-dimethylformamide, methylene chloride, dioxane and tetrahydrofuran.

Most of the glycolic acid derivatives, $R_1R_2C(OH)COOH$, used in this invention are known compounds. Those not described in the art are readily available according to methods known to the skilled practitioner.

The halides of the formula $R_3$-halide are synthesized from the corresponding acid chlorides and aldehydes or ketones in accordance with the general procedures of Ulich et al., J. Am. Chem. Soc. 43, 660 (1921) and Euranto et al., Acta, Chem. Scand. 20, 1273 (1966). The formation of esters from acid salts and alkyl halides is well documented in the chemical literature (Zook and Wagner, "Synthetic Organic Chemistry," John Wiley and Sons, Inc., New York, 1956, p. 484).

The novel penicillins described herein exhibit in vitro activity against a wide variety of microorganisms, including both gram-positive and gram-negative bacteria. Their useful activity can readily be demonstrated by in vitro tests against various organisms in a brain-heat infusion medium by the usual two-fold serial dilution technique. The in vitro activity of the herein described compounds renders them useful for topical application in the form of ointments, creams and the like, or for sterilization purposes, e.g., sick-room utensils.

These novel penicillins are also effective antibacterial agents in vivo in animals, including man, via the parenteral route of administration.

The parenteral dosage levels for the herein described compounds are, in general, on the order of from about 25 to about 200 mg./kg. of body weight per day.

Many of the penicillin ester compounds of this invention exhibit improved absorption on oral administration over that produced by the corresponding free acid or alkali metal salt forms. They, therefore, represent convenient and effective dosage forms of the penicillins of this invention.

Further, many of the esters described herein although inactive or of relatively low activity against gram-negative organisms per se are, when administered orally to animals, including man, metabolized to the parent acid which has a wide spectrum of activity against gram-positive and gram-negative bacteria. The rate of metabolic conversion of such esters to the parent acid occurs at such a rate as to provide an effective and prolonged concentration of the parent acid in the animal body. In effect, such esters act as depot sources for the parent acid. Especially useful in this respect are those compounds wherein the $R_3$ moiety of the ester group is —$CH_2$—O—$COR_4$ wherein $R_4$ is benzyloxy or lower alkyl, especially branched-chain lower alkyl such as t-butyl and 3-pentyl.

The antimicrobial spectrum of 6-(2-phenyl-2-sulfatoacetamido)penicillanic acid disodium salt against several bacteria are presented below. The tests were run under standardized conditions in which nutrient broth containing various concentrations of the test material was seeded with the particular organism specified, and the minimum growth (MIC) at which growth of each organism failed to occur was observed and recorded.

Table I.—In vitro data of disodium 6-(DL-2-phenyl-2-sulfatoacetamdio)penicillanic acid (MIC; mcg./mg.)

| Organism: | MIC |
|---|---|
| Staphylococcus aureus | 3.12 |
| Streptococcus pyogenes | 0.098 |
| Pasteurella multocida | 1.56 |
| Erysipelothrix insidiosa | 0.012 |
| Salmonella cholerasuis | 100 |
| Aerobacter aerogenes | >200 |
| Hemophilus influenzae | 3.12 |
| Klebsiella pneumoniae | >200 |
| Pseudomonas aeruginosa | 25 |
| Escherichia coli | 50 |
| Proteus mirabilis | 25 |

In vivo data for 6-(DL-2-phenyl-2-sulfatoacetamido)penicillanic acid disodium salt against an experimental Escherichia coli infection in mice show an 80% survival rate when the compound is given subcutaneously at 200 mg./kg. of body weight. The percent survival rate (100×survivors/total number of infected mice) are obtained under standard conditions. The test compound is administered to the infected mice by a multiple dosing regimen in which the first dose is given 0.5 hour after inoculation with the infecting organism, and is repeated four and twenty-four hours later.

Other effective antibacterial agents are analogs of the herein-described ester compounds wherein $R_3$ is

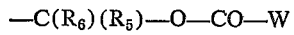

—$C(R_6)(R_5)$—O—CO—W in which $R_6$ is hydrogen and $R_5$ is selected from the group consisting of alkyl, alkoxyalkyl and alkylthioalkyl each containing up to 6 carbon atoms, cycloalkyl of from 3 to 6 carbon atoms, phenylalkyl and mono- and disubstituted phenylalkyl wherein said substituent is selected from the group consisting of alkyl containing up to 3 carbon atoms, chlorine, bromine, fluorine and alkoxy and alkylthio each containing up to 2 carbon atoms, alkyl, alkoxyalkyl and alkylthioalkyl each containing up to 6 carbon atoms, cycloalkyl of from 3 to 6 carbon atoms, phenylalkyl and mono- and disubstituted phenylalkyl wherein said substituent is selected from the group consisting of alkyl containing up to 3 carbon atoms, chlorine, bromine, fluorine and alkoxy and alkylthio each containing up to 2 carbon atoms;

$R_6$ and $R_5$ when taken together with the carbon atom to which they are attached form a ring system of the formula:

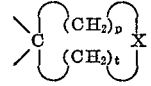

wherein X is selected from the group consisting of $CH_2$, O and S, and $p$ and $t$ are each integers of from 1 to 3;

W is selected from the group consisting of cycloalkyl of from 3 to 8 carbon atoms, phenylalkyl and mono- and disubstituted phenylalkyl wherein said alkyl portion consists of 1 to 3 carbon atoms and said substituents are each chosen from the group consisting of chloro, bromo, fluoro, lower alkoxy, lower alkylthio, lower alkanoylamino, lower alkyl, trifluoromethyl and N,N-di-(n-propyl) sulfamyl.

EXAMPLE I 6-(DL-2-phenyl-2-sulfatoacetamido)penicillanic acid, disodium salt (A) Methyl-2-phenyl-2-sulfatoacetate, triethylamine salt (via chlorosulfonic acid).—Chlorosulfonic acid (0.66 ml.) is added to a solution of DL-mandelic acid methyl ester (1.66 g.) in methylene chloride (25 ml.) at 0° C. The resulting purplish mixture is allowed to warm to room temperature and stirred for five hours. An excess (10%) of triethylamine is added and the mixture concentrated in vacuo to remove solvent and excess triethylamine. The residue is stirred with acetone and filtered to remove triethylamine hydrochloride. The filtrate is evaporated under reduced pressure to an oil which is triturated with ether to remove unreacted methyl mandelate. Removal of the ether provides the product as an oil (3.3 g.).

(B) 2-phenyl - 2-sulfatoacetic acid, di-(triethylamine) salt.—A solution of the triethylamine salt of methyl 2-phenyl-2-sulfatoacetate (2.89 g.) in aqueous sodium hydroxide (33 ml. of 0.05 N) is stirred at room temperature for three hours. The reaction mixture is then treated with Dowex 50, hydrogen form (a sulfonated polystyrene available from the Dow Chemical Co., Midland, Mich.) to a pH of 1.5. The resin is filtered off and the filtrate extracted with ethyl acetate (2×10 ml.). The aqueous solution is treated with an excess of triethylamine (10%) and concentrated under reduced pressure to an oil (2.33 g.).

(C) Acylation of 6-aminopenicillanic acid.—A solution of the di-(triethylammonium) salt of Preparation B (0.402 g.) in acetone (3 ml.) is cooled to 0° C. and ethyl chlorocarbonate (0.095 ml.) added. The mixture is stirred at 0° C. for one hour, filtered and concentrated under reduced pressure to an oil. The oil is taken up in methylene chloride (3 ml.), the solution cooled to 0° C. and 6-aminopenicillanic acid triethylamine salt (0.317 g.) added. The reaction mixture is stirred at 0° C. for one hour and then at room temperature for one hour. Sodium 2-ethylhexanoate (2 equivalents) is added, the mixture stirred for ten minutes and the precipitate of the disodium salt recovered by filtration. It is washed with methylene chloride followed by ether. (Yield=0.322 g.)

EXAMPLE II 6-(DL-2-phenyl-2-sulfatoacetamido)penicillanic acid, disodium salt Methyl 2-phenyl-2-sulfatoacetate (via 1,3-dicyclohexylcarbodiimide).—To a stirred solution of DL-methyl mandelate (1.66 g.) in N,N-dimethylformamide (20 ml.) is added 1,3-dicyclohexylcarbodiimide (1.03 g.) and the resulting solution cooled to −30° C. Concentrated sulfuric acid (0.278 ml.) is added and the cooling bath removed. The mixture is stirred for twenty minutes, then filtered to remove 1,3-dicyclohexylurea. The filtrate is concentrated under reduced pressure and the residue triturated with ether. The ether is decanted, the remaining oil dissolved in methylene chloride and the solution treated with excess triethylamine. The mixture is concentrated in vacuo, the oily residue dissolved in a minimum amount of methylene chloride and ether added to precipitate the product. Removal of the solvents gives 1.3 g. of oil identical (by infrared and nuclear magnetic resonance spectra) to the product of Example I–A.

Utilization of the product in the procedures of Examples I–B and I–C affords the title product.

EXAMPLE III

The methods of Examples I and II are repeated but using the appropriate glycolic acid derivative and 6-aminopenicillanic acid or acyloxy lower alkyl ester thereof to provide the following compounds as their sodium salts:

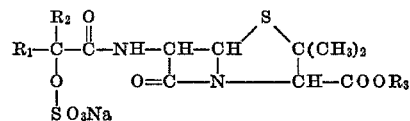

| R1 | R2 | R3 | Method |
|---|---|---|---|
| 4-ClC₆H₄ | H | CH(CH₃)OCOC₂H₅ | I |
| 2-BrC₆H₄ | H | Na | I |
| 2-BrC₆H₄ | H | CH₂OCOCH(C₂H₅)₂ | I |
| 3-BrC₆H₄ | H | Na | I |
| 4-BrC₆H₄ | H | Na | I |
| 4-BrC₆H₄ | H | CH₂OCO(4-CF₃C₆H₄) | I |
| 4-C₂H₅C₆H₄ | H | Na | I |
| 4-C₂H₅C₆H₄ | H | CH₂OCOC(CH₃)₃ | I |
| 4-(t-C₄H₉)C₆H₄ | H | Na | II |
| 4-(t-C₄H₉)C₆H₄ | H | CH₂OCOCH₃ | II |
| 2-CH₃OC₆H₄ | H | Na | II |
| 2-CH₃OC₆H₄ | H | CH(CH₃)OCOCH₃ | I |
| 3-CH₃OC₆H₄ | H | Na | I |
| 4-CH₃OC₆H₄ | H | Na | I |
| 4-C₄H₉OC₆H₄ | H | Na | I |
| 4-C₄H₉OC₆H₄ | H | CH₂OCO-n-C₃H₇ | I |
| C₆H₅ | H | CH₂OCOC(CH₃)₃ | I |
| C₆H₅ | H | CH₂OCOCH₃ | I |
| C₆H₅ | H | CH(CH₃)OCOCH₃ | I |
| C₆H₅ | H | CH₂OCOC₆H₅ | I |
| C₆H₅ | H | CH₂OCO(4-ClC₆H₄) | I |
| 2-CH₃C₆H₄ | H | Na | I |
| 2-CH₃C₆H₄ | H | CH₂OCOC(CH₃)₃ | I |
| 3-CH₃C₆H₄ | H | Na | I |
| 3-CH₃C₆H₄ | H | CH₂OCOCH(C₂H₅)C₃H₇ | I |
| 4-CH₃C₆H₄ | H | Na | I |
| 4-CH₃C₆H₄ | H | CH₂OCOCH(CH₃)₂ | I |
| 2-ClC₆H₄ | H | Na | I |
| 2-ClC₆H₄ | H | CH₂OCO(n-C₃H₇) | I |
| 2-ClC₆H₄ | H | CH₂OCO(2-CH₃C₆H₄) | I |
| 3-ClC₆H₄ | H | Na | I |
| 3-ClC₆H₄ | H | CH₂OCOC₂H₅ | I |
| 4-ClC₆H₄ | H | Na | I |
| 4-CF₃C₆H₄ | CH₃ | CH₂OCO(2-BrC₆H₄) | I |
| C₆H₅ | n-C₃H₇ | Na | I |
| 2-CF₃C₆H₄ | CH₃ | Na | I |
| 2-CF₃C₆H₄ | CH₃ | CH(CH₃)OCOCH₃ | I |
| C₄H₇ | H | Na | I |
| C₄H₇ | H | CH₂OCOCH(C₂H₅)₂ | I |
| C₄H₇ | H | CH₂OCOC₆H₅ | I |
| C₄H₇ | H | CH₂OCO-(3-ClC₆H₄) | I |
| C₅H₉ | H | Na | I |
| C₅H₉ | H | CH₂OCOC₃H₇ | I |
| C₅H₉ | H | CH(C₂H₅)OCOC₂H₅ | I |
| C₆H₁₁ | H | Na | II |
| C₆H₁₁ | H | CH₂OCOC(CH₃)₃ | II |
| C₆H₁₁ | H | CH(CH₃)OCOCH₃ | II |
| C₇H₁₃ | H | Na | II |
| C₇H₁₃ | H | CH₂OCOCH₃ | II |
| C₃H₅ | H | Na | I |
| C₃H₅ | H | CH₂OCOCH₃ | I |
| C₃H₅ | CH₃ | Na | I |
| C₃H₅ | CH₃ | CH₂OCOC(CH₃)₃ | I |
| C₃H₅ | CH₃ | CH₂OCOC₂H₅ | I |
| C₆H₁₁ | CH₃ | Na | II |
| C₆H₁₁ | CH₃ | CH(CH₃)OCOCH₃ | II |
| C₆H₁₁ | CH₃ | CH₂OCOCH(CH₃)₂ | II |

| $R_1$ | $R_2$ | $R_3$ | Method |
|---|---|---|---|
| $C_6H_{11}$ | $C_2H_5$ | Na | II |
| $C_6H_{11}$ | $C_2H_5$ | $CH_2OCOCH(C_2H_5)_2$ | II |
| $C_6H_{11}$ | $n-C_4H_9$ | Na | II |
| $C_6H_{11}$ | $n-C_4H_9$ | $CH(C_2H_5)OCOCH_3$ | II |
| $C_6H_{11}$ | $n-C_4H_9$ | $CH_2OCOC_6H_5$ | II |
| $2-CF_3C_6H_4$ | H | Na | I |
| $2-CF_3C_6H_4$ | H | $CH_2OCOC_2H_5$ | I |
| $3-CF_3C_6H_4$ | H | $CH_2OCOC_2H_5$ | I |
| $4-CF_3C_6H_4$ | H | Na | I |
| $4-CF_3C_6H_4$ | H | $CH(C_2H_5)OCOC_2H_5$ | I |
| $C_6H_5$ | $CH_3$ | Na | II |
| $C_6H_5$ | $CH_3$ | $CH_2OCOCH_3$ | II |
| $C_6H_5$ | $CH_3$ | $CH(n-C_3H_7)OCOCH_3$ | II |
| $C_6H_5$ | $n-C_4H_9$ | Na | II |
| $C_6H_5$ | $n-C_4H_9$ | $CH_2OCOC(CH_3)_3$ | II |
| $C_6H_5$ | $s-C_4H_9$ | Na | II |
| $C_6H_5$ | $C_2H_5$ | Na | II |
| $4-ClC_6H_4$ | $CH_3$ | $CH(C_2H_5)OCOC_2H_5$ | I |
| $4-ClC_6H_4$ | $CH_3$ | Na | I |
| $4-CH_3OC_6H_4$ | $CH_3$ | Na | I |
| $4-CH_3OC_6H_4$ | $CH_3$ | $CH(CH_3)OCOCH_3$ | I |
| $3-CH_3C_6H_4$ | $CH_3$ | Na | I |
| $3-CH_3C_6H_4$ | $CH_3$ | $CH_2OCO(4-FC_6H_4)$ | I |
| $4-CH_3C_6H_4$ | $i-C_3H_7$ | Na | I |
| $4-ClC_6H_4$ | $i-C_3H_7$ | Na | I |
| $3-CF_3C_6H_4$ | $CH_3$ | Na | I |
| $3-CF_3C_6H_4$ | $CH_3$ | $CH_2OCO(3-BrC_6H_4)$ | I |
| $3-CF_3C_6H_4$ | $i-C_3H_7$ | Na | I |
| $4-CF_3C_6H_4$ | $CH_3$ | Na | I |
| $CH_3$ | H | Na | I |
| $CH_3$ | H | $CH_2OCOCH(CH_3)_2$ | I |
| $CH_3$ | H | $CH_2OCOC_6H_5$ | I |
| $C_2H_5$ | H | Na | I |
| —$CH_2$—$CH_2$—$CH_2$— | | $CH_2OCOCH_3$ | I |
| $n-C_3H_7$ | H | Na | I |
| $n-C_4H_9$ | H | Na | I |
| $n-C_4H_9$ | H | $CH_2OCOCH_3$ | I |
| $n-C_4H_9$ | H | $CH(CH_3)OCOCH_3$ | I |
| $n-C_6H_{13}$ | H | Na | I |
| $n-C_6H_{13}$ | H | $CH_2OCOCH(C_2H_5)$ | I |
| $n-C_9H_{19}$ | H | Na | I |
| $n-C_{15}H_{31}$ | H | Na | I |
| $n-C_{15}H_{31}$ | H | $CH_2OCOCH_3$ | I |
| $n-C_{15}H_{31}$ | H | $CH_2OCOC_6H_5$ | I |
| $CH_3$ | $CH_3$ | Na | I |
| $CH_3$ | $CH_3$ | $CH_2(OCOCH(CH_3)_2$ | I |
| $C_2H_5$ | $CH_3$ | Na | I |
| $n-C_3H_7$ | $CH_3$ | Na | I |
| $n-C_6H_{13}$ | $CH_3$ | $CH(CH_3)OCOC_3H_7$ | I |
| $n-C_3H_7$ | $n-C_3H_7$ | Na | I |
| $n-C_3H_7$ | $n-C_3H_7$ | $CH_2OCOC_2H_5$ | I |
| $i-C_3H_7$ | $C_2H_5$ | Na | I |
| $i-C_3H_7$ | $i-C_3H_7$ | Na | I |
| $i-C_3H_7$ | $i-C_3H_7$ | $CH(C_3H_7)OCOCH_3$ | I |
| $(C_6H_{13})(C_2H_5)CH$ | H | Na | I |
| $n-C_4H_9$ | $CH_3$ | Na | I |
| —$CH_2$—$CH_2$— | | Na | I |
| —$CH_2$—$CH_2$— | | $CH(CH_3)OCOC_2H_5$ | I |
| —$CH_2$—$CH_2$—$CH_2$— | | Na | I |
| —$CH_2$—$CH_2$—$CH_2$— | | $CH_2OCOC(CH_3)_3$ | I |
| —$CH_2$—$CH_2$—$CH_2$— | | $CH_2OCOC_6H_5$ | I |
| —$CH_2$—$CH_2$—$CH_2$—$CH_2$— | | Na | I |
| —$CH_2$—$CH_2$—$CH_2$—$CH_2$— | | $CH(CH_3)OCOCH_3$ | I |
| —$CH_2$—$CH_2$—$CH_2$—$CH_2$— | | $CH_2$—O—CO-4-$ClC_6H_4$ | I |
| —$(CH_2)_5$— | | Na | II |
| —$(CH_2)_5$— | | $CH_2OCOCH(C_2H_5)_2$ | II |
| —$(CH_2)_5$— | | $CH(CH_3)OCOC_2H_5$ | II |
| —$(CH_2)_6$— | | Na | II |
| —$(CH_2)_6$— | | $CH_2OCO-n-C_4H_9$ | II |
| —$(CH_2)_6$— | | $CH_2OCOCH(CH_3)_2$ | II |
| —$(CH_2)_6$— | | $CH_2OCOC_6H_5$ | II |
| 2-thienyl | H | Na | II |
| 2-thienyl | H | $CH_2OCOC(CH_3)_3$ | II |
| 2-thienyl | H | $CH_2OCOC_6H_5$ | II |
| 3-thienyl | H | Na | II |
| 3-thienyl | H | $CH_2OCOC(CH_3)_3$ | II |
| 3-thienyl | H | $CH(CH_3)OCOCH_3$ | II |
| 3-thienyl | H | $CH_2OCO-4-CH_3C_6H_4$ | II |

EXAMPLE IV

The salts of the penicillin products of Examples I–II are transformed to their acid forms by careful neutralization of aqueous solutions thereof with Dowex 50, acid form (a strong cation exchange, sulfonated, polystyrene resin available from The Dow Chemical Co.) and evaporated, after filtration, to give the free acids.

EXAMPLE V

The free acids of the preceding example are transformed to their monosodium, calcium, magnesium, ammonium, procaine, N,N'-dibenzylethylenediamine, N-ethylpiperidine, dibenzylamine, 1-ephenamine, triethylamine, N-benzyl-β-phenethylamine, N,N'-bis(dehydroabietyl)ethylenediamine and benzhydrylamine salts by reaction of aqueous solutions thereof with one equivalent of the appropriate base. The salts are recovered by freeze drying.

EXAMPLE VI

The free acids of Example IV are converted to dicationic salts of potassium, calcium, magnesium, ammonia, procaine, N,N'-dibenzylethylenediamine, N-ethylpiperidine, dibenzylamine, 1-ephenamine, triethylamine, N-benzyl-β-phenethylamine, N,N' - bis(dehydroabietyl) ethylenediamine and benzhydrylamine by reaction of aqueous solutions thereof with two equivalents of the appropriate base. The salts are recovered by freeze drying.

EXAMPLE VII

A parenteral form of 6-(2-phenyl-2-sulfatoacetamido) penicillanic acid disodium salt is prepared by dissolving an intimate mixture of the disodium salt of the penicillin compound and sodium citrate (4 percent by weight) in sufficient polyethylene glycol 200 such that the final concentration of the penicillin compound is 25 mg. of active ingredient per milliliter. The resulting solution is sterilized by filtration and sterilely stoppered in vials.

In like manner, formulations of the products of this invention are made.

What is claimed is:

1. A compound of the formula:

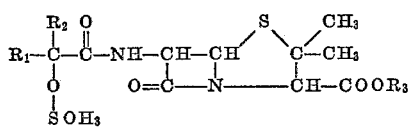

and the non-toxic cationic salts thereof wherein $R_1$ is selected from the group consisting of thienyl, alkyl of from 1 to 15 carbon atoms, cycloalkyl of from 3 to 7 carbon atoms, phenyl and substituted phenyl wherein the substituent is selected from the group consisting of chloro, bromo, lower alkyl, lower alkoxy and trifluoromethyl;

$R_2$ is selected from the group consisting of hydrogen and lower alkyl;

$R_1$ and $R_2$ together with the carbon atom to which they are attached are cycloalkyl of from 3 to 7 carbon atoms;

and $R_3$ is selected from the group consisting of hydrogen and acyloxy lower alkyl wherein the acyloxy moiety is selected from the group consisting of lower alkanoyloxy, benzoyloxy and substituted benzoyloxy wherein the substituent is selected from the group consisting of chloro, bromo, fluoro, lower alkyl, lower alkoxy and trifluoromethyl.

2. A compound according to claim 1 wherein $R_1$ is phenyl and $R_2$ is hydrogen.

3. A compound according to claim 1 wherein $R_1$ and $R_2$ together with the carbon atom to which they are attached are cyclobutyl and $R_3$ is acyloxy lower alkyl.

4. A compound according to claim 1 wherein $R_1$ is alkyl, $R_2$ is lower alkyl and $R_3$ is hydrogen.

5. 6-(2-cyclohexyl - 2 - sulfatoacetamido)penicillanic acid, a compound according to claim 1 wherein $R_1$ is cyclohexyl, and each of $R_2$ and $R_3$ is hydrogen.

6. A compound according to claim 2 wherein $R_3$ is acyloxy lower alkyl.

7. 6-(2-phenyl-2 - sulfatoacetamido)penicillanic acid, a compound according to claim 2 wherein $R_1$ is phenyl and each of $R_2$ and $R_3$ is hydrogen.

8. Acetoxymethyl 6-(1-cyclobutyl - 1-sulfatocarboxamido)penicillanate, a compound according to claim 3 wherein $R_3$ is acetoxymethyl.

9. 6-(2-diisopropyl - 2 - sulfatoacetamido)penicillanic acid, a compound according to claim 4 wherein each of $R_1$ and $R_2$ is isopropyl and $R_3$ is hydrogen.

10. Pivaloyloxymethyl 6-(2-phenyl - 2 - sulfatoacetamido)penicillanate, a compound according to claim 6 wherein $R_3$ is pivaloyloxymethyl.

References Cited

UNITED STATES PATENTS 3,660,379   5/1972   Morimoto et al. ____ 260—239.1

NICHOLAS S. RIZZO, Primary Examiner

U.S. Cl. X.R.

424—271

PO-1050
(5/69)

UNITED STATES PATENT OFFICE
CERTIFICATE OF CORRECTION

Patent No. 3,748,323      Dated July 24, 1973

Inventor(s) Ernest S. Hamanaka

It is certified that error appears in the above-identified patent and that said Letters Patent are hereby corrected as shown below:

Col. 2, lines 5-10, that portion of the formula reading "-COOR" should read -- $-COOR_3$ --.

Col. 5, line 35, "heat" should read -- heart --.

Col. 5, line 65, "benzyloxy" should read -- benzyl --.

Signed and sealed this 5th day of February 1974.

(SEAL)
Attest:

EDWARD M. FLETCHER, JR.
Attesting Officer

RENE D. TEGTMEYER
Acting Commissioner of Patents